United States Patent
Yasuda

(10) Patent No.: US 12,277,611 B2
(45) Date of Patent: Apr. 15, 2025

(54) FISHING INFORMATION MANAGEMENT SYSTEM AND PROCESSING METHOD

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 233 days.

(21) Appl. No.: 17/190,797

(22) Filed: Mar. 3, 2021

(65) Prior Publication Data

US 2022/0061291 A1 Mar. 3, 2022

(30) Foreign Application Priority Data

Aug. 27, 2020 (JP) ................................. 2020-143238
Sep. 29, 2020 (JP) ................................. 2020-163603

(51) Int. Cl.
*A01K 97/12* (2006.01)
*A01K 89/01* (2006.01)
(Continued)

(52) U.S. Cl.
CPC ......... *G06Q 50/02* (2013.01); *A01K 89/0122* (2015.05); *A01K 89/0178* (2015.05);
(Continued)

(58) Field of Classification Search
CPC ...... A01K 97/00; A01K 97/12; A01K 97/125; A01K 99/00; A01K 89/00; A01K 89/012;
(Continued)

(56) References Cited

U.S. PATENT DOCUMENTS 6,584,722 B1 * 7/2003 Walls ..................... A01K 97/00
43/4.5
7,523,882 B2 * 4/2009 Priednieks ......... A01K 89/0108
242/231
(Continued)

FOREIGN PATENT DOCUMENTS

CN           1466416 A        1/2004
CN         102077814 A  *     6/2011    ............. A01K 89/01
(Continued)

OTHER PUBLICATIONS

Chinese Office Action for related Chinese Application No. 202110244997.5; action dated Sep. 20, 2022; (23 pages).
(Continued)

Primary Examiner — Michael R Mansen
Assistant Examiner — Henrix Soto
(74) Attorney, Agent, or Firm — Oliff PLC

(57) ABSTRACT

A fishing information management system has a fishing rod to which a fishing reel with a spool capable of winding a fishing line is attached, and is configured to include a fishing line unwinding commencement detector that detects the commencement of the unwinding of the fishing line by the fishing reel, an operation information detector that detects the operation information of at least either of the fishing reel or the fishing rod, an operation information list creation portion that extracts the operation information each time when the unwinding of the fishing line commences and creates an operation information list that aggregates several operation information, a receiver that obtains fishing information from an external device, and a processor that associates the operation information list with the fishing information.

10 Claims, 11 Drawing Sheets

(51) Int. Cl.
*A01K 89/015* (2006.01)
*G06F 3/14* (2006.01)
*G06Q 50/02* (2012.01)
*H04N 23/80* (2023.01)

(52) U.S. Cl.
CPC .............. *A01K 97/125* (2013.01); *G06F 3/14* (2013.01); *H04N 23/80* (2023.01)

(58) Field of Classification Search
CPC .............. A01K 89/0122; A01K 89/017; A01K 89/0178; A01K 89/0183; G06F 3/14; H04N 23/80
See application file for complete search history.

(56) References Cited

U.S. PATENT DOCUMENTS

| | | | | |
|---|---|---|---|---|
| 7,861,454 | B2 * | 1/2011 | Pekin | A01K 97/00 43/16 |
| 9,968,078 | B2 * | 5/2018 | Worley, III | H04L 67/12 |
| 2003/0111569 | A1 | 6/2003 | Hitomi | |
| 2008/0289242 | A1 * | 11/2008 | Cecil | A01K 97/125 43/18.1 R |
| 2014/0358483 | A1 * | 12/2014 | da Rosa | A01K 87/007 702/188 |
| 2018/0295826 | A1 * | 10/2018 | Blackadar | H04L 67/535 |
| 2018/0295827 | A1 | 10/2018 | Blackadar et al. | |
| 2018/0295828 | A1 | 10/2018 | Blackadar et al. | |
| 2018/0295829 | A1 | 10/2018 | Blackadar et al. | |
| 2018/0338485 | A1 | 11/2018 | Blackadar et al. | |
| 2018/0338486 | A1 | 11/2018 | Blackadar et al. | |
| 2018/0361239 | A1 | 12/2018 | Blackadar et al. | |
| 2020/0137995 | A1 | 5/2020 | Ikebukuro | |
| 2021/0185996 | A1 | 6/2021 | Okamura | |

FOREIGN PATENT DOCUMENTS

| | | | | |
|---|---|---|---|---|
| JP | 2004290127 | A | 10/2004 | |
| JP | 2006-042607 | A | 2/2006 | |
| JP | 2007-185159 | A | 7/2007 | |
| JP | 2014000030 | A * | 1/2014 | .......... A01K 89/015 |
| JP | 2015-226479 | A | 12/2015 | |
| JP | 2019187283 | A | 10/2019 | |
| JP | 2020068736 | A | 5/2020 | |
| WO | 2017112778 | A1 | 6/2017 | |
| WO | WO-2019082921 | A1 * | 5/2019 | ............ A01K 85/00 |
| WO | 2019208116 | A1 | 10/2019 | |

OTHER PUBLICATIONS

Extended European Search report for related European Application No. 21160488.9; action dated Aug. 10, 2021; (7 pages).
Second Office Action in connection with Chinese Patent Application No. 202110244997.5; action dated May 10, 2023; (15 pages).
Korean Office Action in connection with related Korean Patent Application No. 10-2021-0022287; action dated Feb. 1, 2023; (8 pages).
Korean Office Action in connection with Korean Patent Application No. 10-2021-0022287; action mailed on Aug. 22, 2023; (6 pages).
Office Action for related Japanese Application No. 2020-163603; action dated Jul. 5, 2023; (18 pages).
Dec. 27, 2023 Office Action issued in Korean Patent Application No. 10-2021-0022287.
Jan. 23, 2024 Office Action issued in Japanese Patent Application No. 2020-163603.
Jan. 20, 2024 Office Action issued in Chinese Patent Application No. 202110244997.5.
Nov. 4, 2023 Office Action issued in Chinese Patent Application No. 202110244997.5.

* cited by examiner

FIG. 6

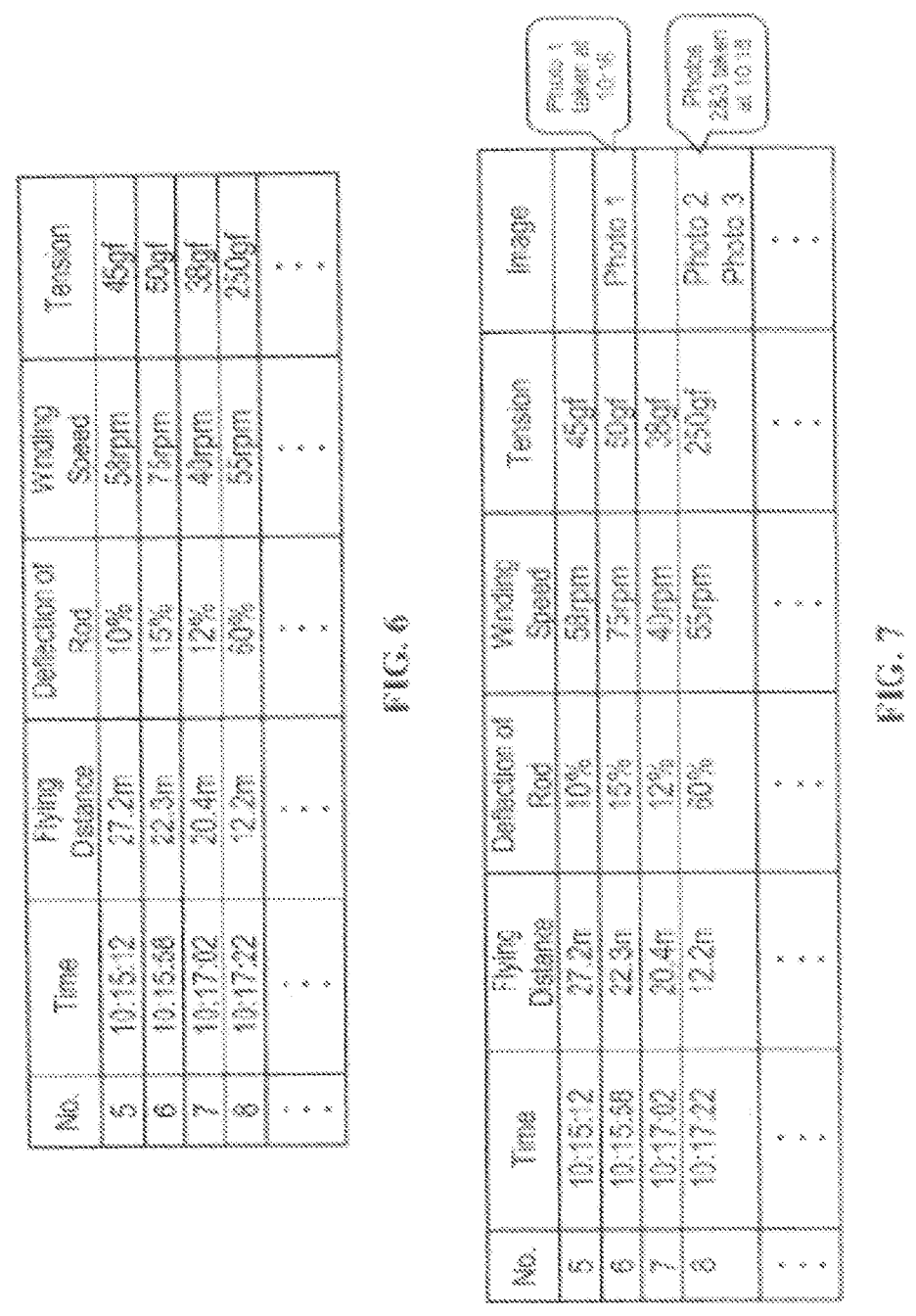

| No. | Time | Flying Distance | Deflection of Rod | Winding Speed | Tension |
|---|---|---|---|---|---|
| 5 | 10:15:12 | 27.2n | 10% | 50rpm | 450gf |
| 6 | 10:15:38 | 22.3n | 15% | 75rpm | 500gf |
| 7 | 10:17:02 | 20.4n | 12% | 40rpm | 350gf |
| 8 | 10:17:22 | 12.2n | 30% | 55rpm | 250gf |
| ... | ... | ... | ... | ... | ... |

FIG. 7

| No. | Time | Flying Distance | Deflection of Rod | Winding Speed | Tension | Image |
|---|---|---|---|---|---|---|
| 5 | 10:15:12 | 27.2n | 10% | 50rpm | 450gf | |
| 6 | 10:15:38 | 22.3n | 15% | 75rpm | 500gf | Photo 1 |
| 7 | 10:17:02 | 20.4n | 12% | 40rpm | 350gf | Photo 2 |
| 8 | 10:17:22 | 12.2n | 30% | 55rpm | 250gf | Photo 3 |
| ... | ... | ... | ... | ... | ... | ... |

FIG. 9

| No. | Time | Flying Distance | Deflection of Rod | Winding Speed | Tension | Lure |
|---|---|---|---|---|---|---|
| 5 | 10:15:12 | 27.2m | 10% | 50rpm | 45pf | Lure A |
| 6 | 10:15:58 | 22.3m | 15% | 75rpm | 80pf | Lure A |
| 7 | 10:17:02 | 20.4m | 12% | 40rpm | 30pf | Lure B |
| 8 | 10:17:22 | 12.2m | 80% | 55rpm | 250pf | Lure B |
| ... | ... | ... | ... | ... | ... | ... |

Lure A recognized at 10:14
Lure B recognized at 10:16

FIG. 10

| No. | Time | Flying Distance | Deflection of Rod | Winding Speed | Tension | Event |
|---|---|---|---|---|---|---|
| 5 | 10:15:12 | 27.2m | 10% | 50rpm | 45pf |  |
| 6 | 10:15:58 | 22.3m | 15% | 75rpm | 80pf | Snapping |
| 7 | 10:17:02 | 20.4m | 12% | 40rpm | 30pf |  |
| 8 | 10:17:22 | 12.2m | 80% | 55rpm | 250pf | Hit |
| ... | ... | ... | ... | ... | ... | ... |

Button 1 detected at 10:15:58
Button 2 detected at 10:17:22

| No. | Time | Flying Distance | Deflection of Rod | Winding Speed | Tension | Water Depth | Reactions in Fish School |
|---|---|---|---|---|---|---|---|
| 5 | 10:15:12 | 27.2m | 10% | 58rpm | 45gf | 26.2m | Weak |
| 6 | 10:15:38 | 22.3m | 15% | 70rpm | 60gf | 24.4m | Weak |
| 7 | 10:17:02 | 20.4m | 12% | 40rpm | 38gf | 19.5m | Medium |
| 8 | 10:17:22 | 12.2m | 60% | 55rpm | 250gf | 15.8m | Strong |
| ... | ... | ... | ... | ... | ... | ... | ... |

FIG. 11

| No. | Time | Flying Distance | Deflection of Rod | Winding Speed | Tension | Water Temperature | Humidity |
|---|---|---|---|---|---|---|---|
| 5 | 10:15:12 | 27.2m | 10% | 58rpm | 45gf | 24.5°C | 75% |
| 6 | 10:15:38 | 22.3m | 15% | 70rpm | 60gf | 24.4°C | 73% |
| 7 | 10:17:02 | 20.4m | 12% | 40rpm | 38gf | 24.4°C | 70% |
| 8 | 10:17:22 | 12.2m | 60% | 55rpm | 250gf | 24.5°C | 73% |
| ... | ... | ... | ... | ... | ... | ... | ... |

FIG. 12

| No. | Time | Flying Distance | Deflection of Rod | Winding Speed | Tension | Tide Level |
|---|---|---|---|---|---|---|
| 5 | 10:15:12 | 27.2m | 10% | 58rpm | 45gf | 152cm |
| 6 | 10:15:58 | 22.3m | 15% | 75rpm | 50gf | 152cm |
| 7 | 10:17:02 | 20.4m | 12% | 40rpm | 38gf | 153cm |
| 8 | 10:17:22 | 12.2m | 60% | 55rpm | 250gf | 154cm |
| ⋮ | ⋮ | ⋮ | ⋮ | ⋮ | ⋮ | ⋮ |

FISHING INFORMATION MANAGEMENT SYSTEM AND PROCESSING METHOD

TECHNICAL FIELD

This disclosure relates to a fishing information management system including a fishing rod to which a fishing reel with a spool capable of winding a fishing line is attached, and a processing method.

BACKGROUND

Generally, when fishing deep-field fish such as in boat fishing, an electric fishing reel ("fishing reel") has been widely used.

Conventionally, that type of fishing reel is provided with a line-length measuring device that measures the length of a wound or unwound fishing line based on the rotation speed of a spool to improve the catch by accurately adjusting the fishing depth, and the values measured by the line-length measuring device appear on an indicator provided on the reel body.

As such a fishing reel, Japanese Patent Application Publication No. 2006-42607 discloses a fishing reel including a spool rotatably supported by the side plates of the reel body therebetween, a winding speed detection means that detects the winding speed during the winding operation of a fishing line wound on the spool, and an indicator that displays the values detected by the winding speed detection means.

However, in the fishing reel disclosed in JP '607, detection values of winding speed are displayed on an indicator provided on the reel body, but are not intended to be transmitted to the outside of the reel. Further, even if the fishing reel information can be displayed, the fishing reel disclosed in JP '607 only displays information relevant to the reel though there are a variety of fishing information such as a lure, fishing images and a fishing environment. There was, therefore, a problem that the information is extremely limited compared to the information generally desired by fishermen.

It could therefore be helpful to provide a fishing information management system including a fishing rod at which a fishing reel with a spool capable of winding a fishing line is attached, and that can link various fishing information in conjunction with an external device, and a processing method.

SUMMARY

We thus provide:

A fishing information management system has a fishing rod to which a fishing reel with a spool capable of winding a fishing line is attached, and is configured to include a fishing line unwinding commencement detector (fishing line unwinding commencement detecting unit or fishing line unwinding commencement detecting portion) that detects the commencement of the unwinding of the fishing line by the fishing reel, an operation information detector (operation information detecting unit or operation information detecting portion) that detects the operation information of at least either of the fishing reel or the fishing rod, an operation information list creation portion (operation information list creation unit) that extracts the operation information each time when the unwinding of the fishing line commences and creates an operation information list that aggregates several operation information, a receiver (receiving unit or receiving portion) that obtains fishing information from an external device, and a processor (processing unit or processing portion) that associates the operation information list with the fishing information.

A fishing information management system may include an indicator (indicating unit or indicating portion) configured to display the operation information list and the fishing information that are associated with each other.

An operation information detector may be configured to include a reel operation information detector (reel operation information detecting unit or reel operation information detecting portion) that detects the operation information of the fishing reel, and a fishing rod operation information detector (fishing rod operation information detecting unit or fishing rod operation information detecting portion) that detects the operation information of the fishing rod.

The operation information of the fishing reel may be configured to include at least one of the date and time of use of the reel, the number of uses of the reel, the information on the unwinding of a fishing line wound on a spool, the spool diameter, the maximum spool rotation speed, the spool rotation speed history, the brake setting, the backlash information, the clutch operation information, the drag operation information, and the information on the fishing line wound on the spool.

The operation information of the fishing rod may be configured to include at least one of the date and time of use, the number of uses, the elevation angle, the angular velocity, the angular acceleration, the translational speed, the translational acceleration, the direction, the deformation, and the casting method, of the fishing rod.

The external device may be an imaging device that generates image data related to fishing, and configured such that the operation information list is associated with the image data.

The external device may be a recognition device capable of recognizing a lure, and configured such that the operation information list is associated with the lure information.

The external device may be an event recording device provided in the fishing reel or the fishing rod, and the operation information list and the operation information of the event recording device may be configured to be associated with each other.

The external device may be a fish-finder, and the operation information list and fish school information acquired by the fish-finder may be configured to be associated with each other.

The external device may be an environment sensor that acquires environmental information including at least one of water temperature, air temperature, humidity, wind speed, air pressure, latitude, longitude, and altitude, and the operation information list and the environmental information may be configured to be associated with each other.

The external device may be an information terminal capable of connecting to the Internet, and the operation information list and information acquired from the Internet may be configured to be associated with each other.

A processing method of a fishing information management system includes steps of detecting by a fishing line unwinding commencement detector the commencement of the unwinding of a fishing line by the fishing reel, detecting the operation information of at least either of the fishing reel or the fishing rod by an operation information detector, extracting the operation information each time when the unwinding of the fishing line commences and creating an operation information list that aggregates several operation information, by an operation information list creation portion, acquiring fishing information from an external device by a receiver, and associating the operation information list with the fishing information by a processor, embodied in the fishing information management system including the fishing rod to which the fishing reel with a spool capable of winding the fishing line is attached.

It is thus possible to provide a fishing information management system that includes a fishing rod to which a fishing reel with a spool capable of winding a fishing line is attached, and that can link various fishing information in conjunction with an external device.

BRIEF DESCRIPTION OF THE DRAWINGS

FIG. 6 is a diagram illustrating an example of a list of operation information extracted in a fishing information management system according to an example.

FIG. 7 is a diagram illustrating an example of an operation information list linked to image data in a fishing information management system according to an example.

FIG. 9 is a diagram illustrating an example of an operation information list linked to rig information in a fishing information management system according to an example.

FIG. 10 is a diagram illustrating an example of an operation information list linked to recorded event information in a fishing information management system according to an example.

FIG. 11 is a diagram illustrating an example of an operation information list linked to fish school information in a fishing information management system according to an example.

FIG. 12 is a diagram illustrating an example of an operation information list linked to information from an environment sensor in a fishing information management system according to an example.

DESCRIPTION OF THE NUMERICAL REFERENCES

Figure 1:
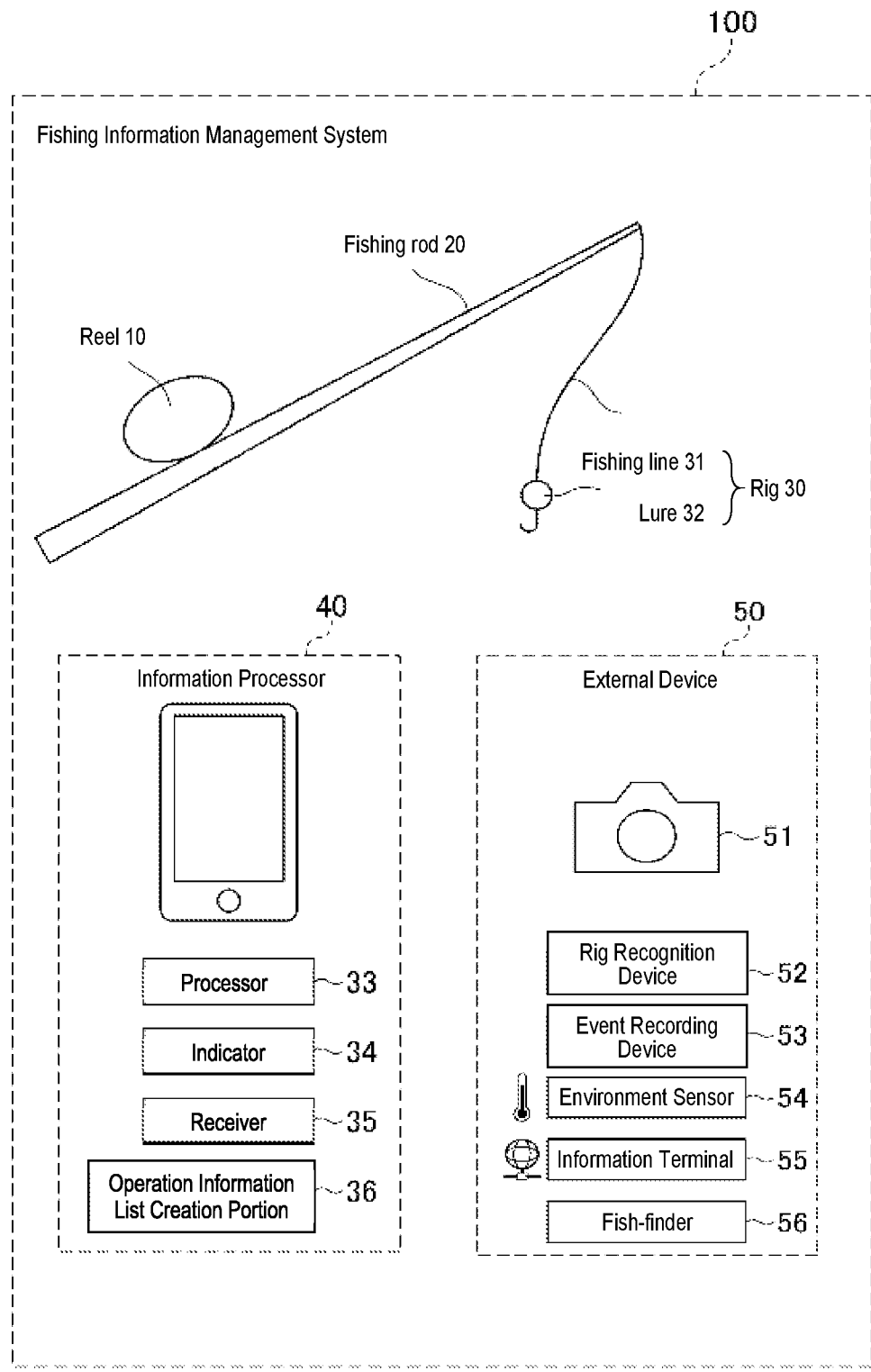
FIG. 1 is a diagram illustrating a fishing information management system according to an example.

10 Fishing reel
11A, 11B Spool
12 Clutch
12B Bale arm line guide
13 (13A, 13B) Drag device
14 (14A, 14B) Operation portion
15 Braking device
16 Calculator
17 Communication portion
18 Storage
19 Reel operation information detector (detector)
20 Fishing rod
21 Fishing rod operation information detector (detector)
30 Rig
31 Fishing line
32 Lure
33 Processor
34 Indicator
35 Receiver
36 Operation information list creation portion
40 Information processor
50 External device (external equipment)
51 Imaging device (camera)
52 Rig recognition device
53 Event recording device
54 Environment sensor
55 Information terminal
56 Fish-finder
100 Fishing information management system
151 Braking force setting portion
191 Tension detector
192 Spool rotation detector
193 Winding operation detector
194 Unwindable state detector
195 Set drag force detector
196 Set braking force detector
211 Deflection detector
212 Direction detector
213 Acceleration detector
214 Angular velocity detector

DETAILED DESCRIPTION

Hereinafter, examples of our systems and methods will be described in detail with reference to the accompanying drawings. Components common in the drawings are denoted by the same reference numerals through the drawings. Each of the drawings is not necessarily scaled for convenience of explanation.

First, a basic configuration of a fishing information management system 100 according to an example will be described with reference to FIGS. 1 to 4. FIG. 1 shows a configuration of the fishing information management system 100. As illustrated, the fishing information management system 100 includes a fishing reel 10, a fishing rod 20, a rig 30, an information processor 40, and an external device 50. Like general fishing reels, the fishing reel 10 can be operated in the following manner.

The fishing reel 10 can wind a fishing line 31 on a spool 11, switch between the states in which the fishing line 31 can be, and cannot be, reeled out from the spool 11, set the threshold of a tension idling the spool 11 by applying a tension equal to or greater than a set value to the fishing line 31 (drag function), and adjust braking force to prevent backlash upon casting (only for a double bearing-type reel). Further, the fishing reel 10 detects, and transmits to the information processor 40, part or all of the above operations and states. The details will be described later.

Like general fishing rods, the fishing rod 20 has the fishing reel 10, and guides the fishing line 31. A user can manipulate the fishing line 31 as necessary by operating the fishing rod 20. The fishing rod 20 detects, and transmits to the information processor 40, part or all of the operations and states of the fishing rod 20. The details will be described later.

The rig 30 is attached to one end of a fishing line 31, and has a hook to be bitten by a fish. In this example, a hook is attached within a lure (artificial bait) 32. Further, various types of rigs are used depending on the target fish or fishing method, and a float, a weight, a ground bait container, a balance, and the like are used as necessary. An operation detection means such as an acceleration sensor is provided in part of the rig, transmits the operation of the lure 32 to the information processor 40, and is waterproofed and sealed in part of the rig together with a power source, storage means and communication means.

The reel 10, the fishing rod 20 and the rig 30 are hereinafter collectively called the "tackle." The information processor 40 accumulates detection results from the respective components constituting the tackle, and creates an operation information list that aggregates operation information each time when the unwinding of a fishing line commences. The details will be described later. The information processor 40 may be, for example, a portable information terminal (smart phone), a personal computer, a wearable device, and a fish finder. Further, a fishing information processor 40 may be incorporated in a fishing reel 10 or the fishing rod 20 to constitute part thereof. Alternatively, part of the fishing information processor 40 may be incorporated in the fishing reel 10 or the fishing rod 20. Further, part or all of the information processor 40 may also be located in a server (cloud) on the Internet.

The external device (external equipment) 50 is a device to acquire fishing information that cannot be obtained by the tackle, and can transmit various information to the information processor 40 by a transmitter (transmitting unit or transmitting portion) provided therein. The information processor 40 can associate the received information with an operation information list. The external device 50 is a portion or entirety of an electronic device specifically such as an imaging device (camera) 51, a rig recognition device 52, an event recording device 53, an environment sensor 54, an information terminal 55 and a fish-finder 56. The external device 50 may be configured in the same device as the information processor 40, or may be attachable to the reel 10 or the fishing rod 20.

Figure 2A:
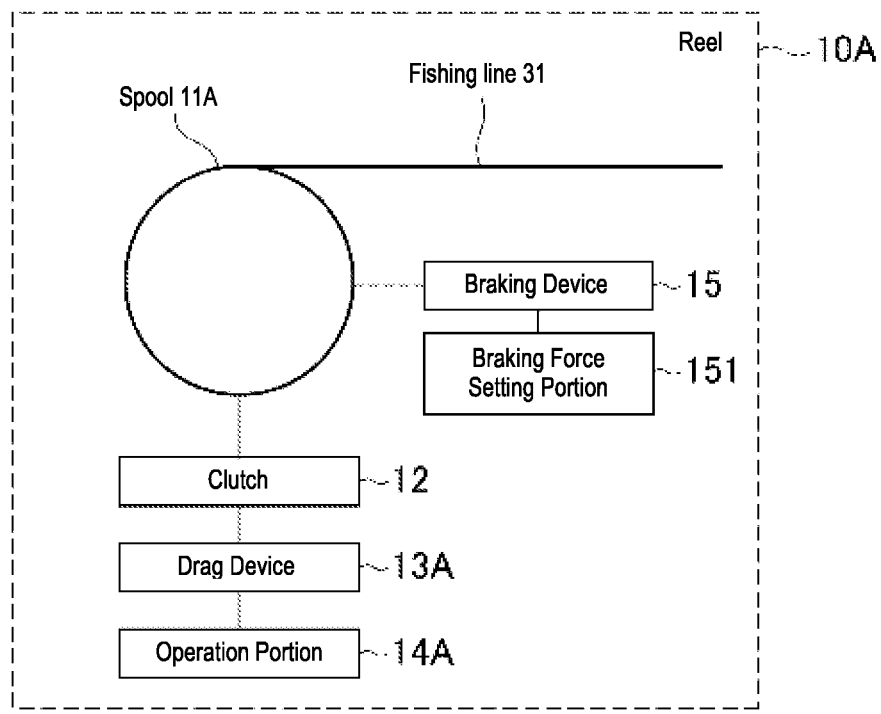
FIGS. 2(a) and 2(b) are diagrams illustrating a fishing information management system according to an example.
Figure 2B:
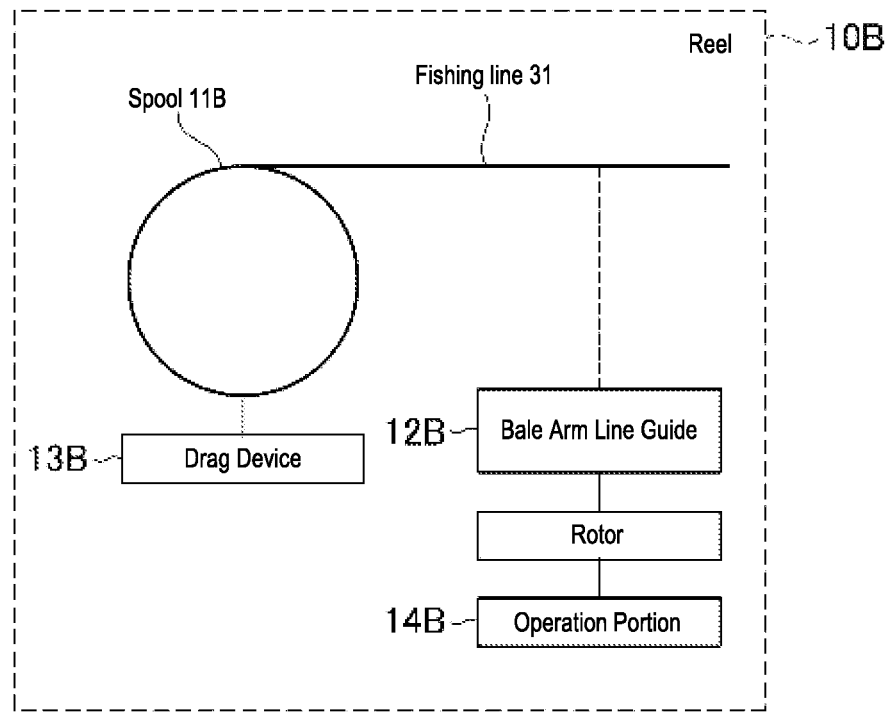

FIGS. 2(*a*) and 2(*b*) are diagrams illustrating a basic configuration of the reel 10: (a) when using a double-bearing-type reel as the reel 10; and (b) when using a spinning-type reel. First, a double bearing reel 10A will be described.

A spool 11A can wind the fishing line 31, and it is possible to wind up the fishing line 31 when the spool is rotated forward by an operation portion (operation unit) 14A. A clutch 12 can select the connection/disconnection of the power transmission to an operating portion 14A. In the connected state, a winding can be made by the operation portion 14A, and in the disconnected state, the spool 11A can be freely rotated in the forward and backward directions so that the fishing line 31 can be reeled out. Further, a drag device 13A can idle the spool 11 when a load equal to or greater than the tension set for the fishing line 31 is applied.

The operation portion 14A is configured, for example, as a handle, and transmits the rotation operation by a user to the spool 11A via a transmission mechanism such as a gear so that the spool 11A can be rotated forward. Further, the operation portion 14A may be a combination of an operation member such as a lever, and a power source such as a motor. Moreover, a braking device 15 can also exert braking force on the spool. This suppresses the occurrence of backlash upon casting. The braking force can be set by a braking force setting portion (braking force setting unit) 151.

Next, a spinning reel 10B will be described. A spool 11B is fixed to the reel body via a drag device 13B. The drag device 13B can idle the spool 11 when a load equal to or greater than a tension set for the fishing line 31 is applied. The fishing line 31 is guided to a bale arm line guide 12B and is wound on the spool 11B when the line guide 12B rotates around the spool 11. The line guide 12B is held at the end of a rotor rotatably supported with respect to the reel body, and guiding of the fishing line 31 is enabled and disabled by opening and closing a bale arm. When the bale arm is open, the fishing line 31 cannot be wound up but can be reeled out. When the bale arm is closed, the fishing line 31 can be wound up but cannot be reeled out. An operation portion 14B is configured, for example, as a handle, transmits the rotation operation by a user to a rotor via a transmission mechanism such as a gear so that the line guide 12B can be rotated forward.

Figure 3:
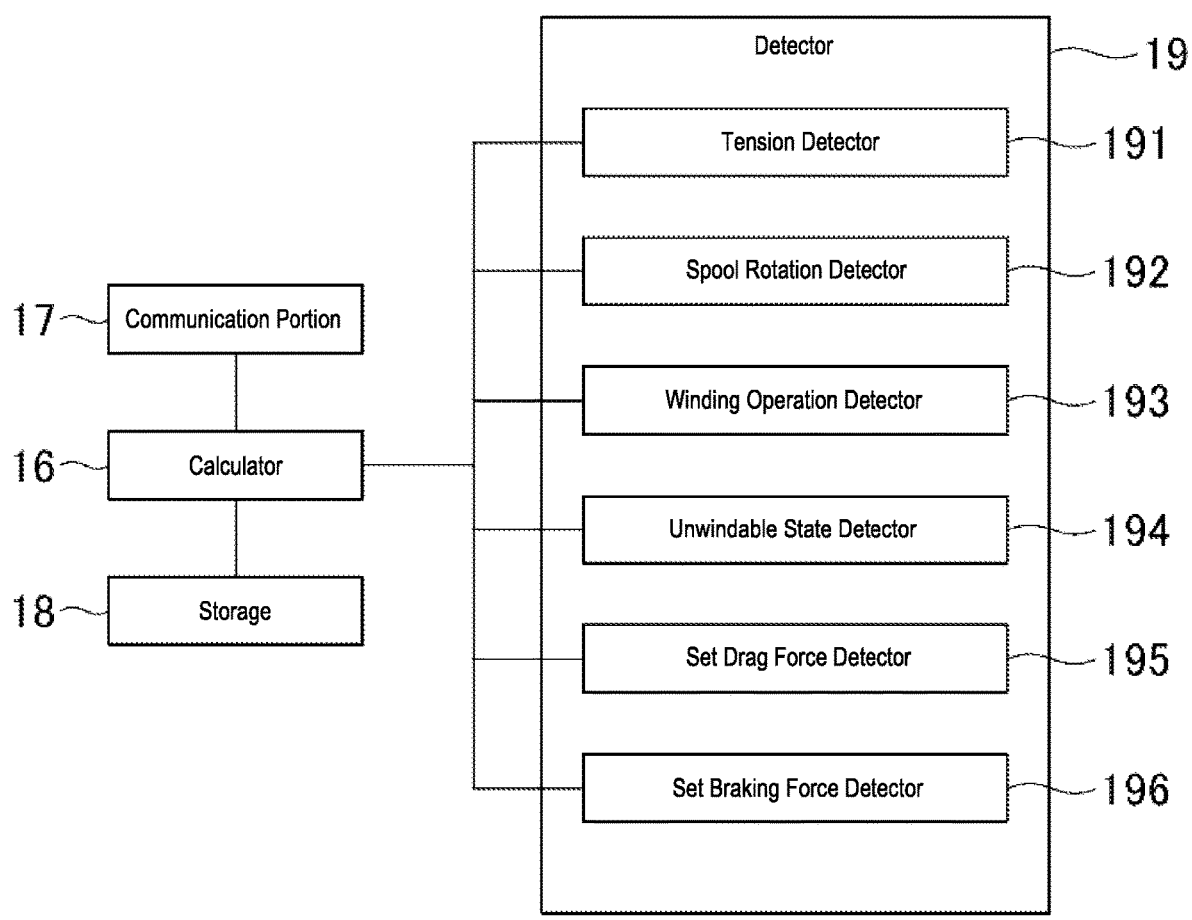
FIG. 3 is a diagram illustrating a fishing information management system according to an example.

FIG. 3 is a diagram illustrating an electronic configuration of the reel 10. The reel 10 can perform various operations by a user, and has a detector (detecting unit or detecting portion) (a detector to detect the state of the reel is called a reel operation information detector 19 or simply, a detector 19). The detection results are sent to a calculator (calculating unit or calculating portion) 16, and are transmitted to the information processor 40 via a communication portion (communication unit) 17 after arithmetic processing or temporary storage in a storage 18 as necessary. The detector 19 includes the followings. Some may be omitted due to limitations of costs, sizes and the like.

A tension detector (tension detecting unit or tension detecting portion) 191 detects a tension acting on the fishing line 31. It can be realized by known techniques such as detecting by a strain sensor force acting on the rotation axis of the pulley that guides the fishing line 31. A spool rotation detector (spool rotation detecting unit or spool rotation detecting portion) 192 detects the rotation of the spool 11. It can be realized by known techniques such as an incremental-type rotation sensor using a photo interrupter. A non-contact type rotation sensor is desirable to achieve smooth rotation of the spool 11. A winding operation detector (winding operation detecting unit or winding operation detecting portion) 193 detects the rotation of the operation portion 14. It can be realized by attaching a rotation sensor to the operation portion 14, or a gear or the like that rotates in conjunction with the operation portion 14.

Further, the amount of idling by the drag device 13 can be calculated by taking the difference between the winding operation detector 193 and a spool rotation detector 192. Moreover, an unwindable state detector (unwindable state detecting unit or unwindable state detecting portion) 194 detects whether or not the fishing line 31 can be unwound from the reel 10. In the exemplary double-bearing reel 10A described above, it can be realized by detecting the connection status of the clutch 12. A limit sensor or the like may be attached to part of the member on which the clutch operates. In the exemplary spinning reel 10B, a limit sensor or the like may be attached to part of the member on which a bale arm operates.

A set drag force detector 195 detects a set tension that is a threshold at which the spool 11 idles. It can be realized by, for instance, detecting charging force acting on a friction member in a drag device by a pressure sensor or the like. Further, a set braking force detector (set braking force detecting unit or set braking force detecting portion) 196 detects a set value of the braking force for backlash suppression. It can be realized by providing a volume resistance or the like to the braking force setting portion 151. In a type of braking device that sets braking force by computer, the set braking force detector 196 can by realized by obtaining a command value to the braking device.

The state and the operation information of the reel 10 can be obtained and calculated by calculating by the calculator 16 the value obtained by the detector 19 as necessary. More specifically, a tension acting on the fishing line, winding amount of the fishing line, pulled-out amount of the drag device, set drag force, unwindable state, and set value of braking force can be obtained. Further, the winding speed and the amount of tension change, which are the time derivative values of the foregoing, can also be calculated.

Figure 4:
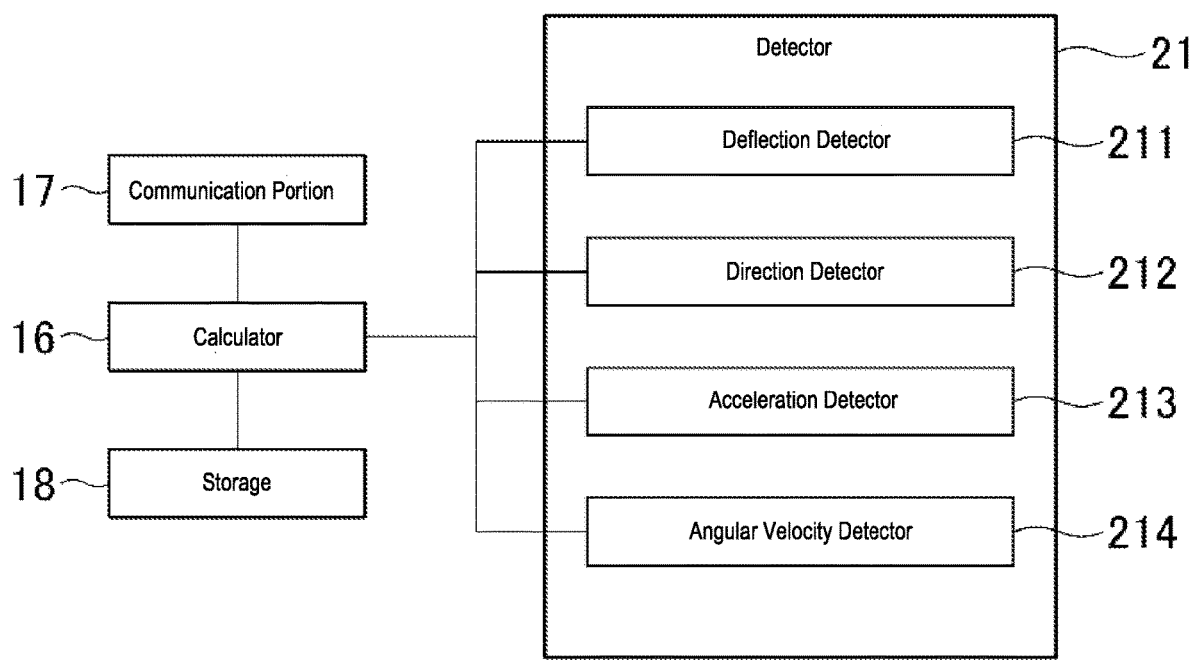
FIG. 4 is a diagram illustrating a fishing information management system according to an example.

Next, the components of the fishing rod 20 will be described in detail with reference to FIG. 4. The fishing rod 20 has the detector (a detector to detect the state of the fishing rod 20 is called a fishing rod operation information detector 21 or simply, a detector 21) to detect various operations by a user. The detection results are sent to the calculator 16, and are transmitted to the information processor 40 via the communication portion 17 after arithmetic processing, or storage or temporary storage in the storage 18 as necessary. The calculator 16, the communication portion 17, and the storage 18 at this time may be shared with those of the reel 10 by using a wired connection or the like, or may be dedicated to the fishing rod 20, or may be disposed within the reel 10 or on the fishing rod 20.

Further, the detector 21 includes the followings. Some may be omitted due to limitations of costs, sizes and the like. A deflection detector (deflection detecting unit or deflection detecting portion) 211 detects the deflection (bend) of the fishing rod 20. It can be realized by providing a strain sensor at various portions of the fishing rod 20. The direction detector (direction detecting unit or direction detecting portion) 212 can detect the direction in which the fishing rod 20 is oriented by detecting the geomagnetic direction. The acceleration detector (acceleration detecting unit or acceleration detecting portion) 213 detects the acceleration in the translation direction of the fishing rod 20. It can be realized using a known acceleration sensor such as a piezoresistive method and a capacitance detection method. Further, an angular velocity detector (angular velocity detecting unit or angular velocity detecting portion) 214 detects the angular velocity of the fishing rod 20 (speed in the rotation direction). It can be realized using a known gyro sensor such as a method of detecting a frequency change of the vibrated piezoelectric element.

A sensor called a nine-axis motion sensor that detects the direction, acceleration and angular velocity of each of orthogonal three axes can be used as the direction detector 212, the acceleration detector 213, and the angular velocity detector 214. Hereafter, they are called motion sensors. The attitude, and the operation by a user, of the fishing rod 20 can be obtained by calculating the detection results described above. The motion sensor may be arranged to be disposed in the reel 10.

Next, in the fishing information management system 100, a fishing reel 1 includes a fishing line unwinding commencement detector that detects the commencement of the unwinding of the fishing line by the fishing reel, and the reel operation information detector 19 that detects the operation information of the fishing reel.

Next, the fishing line unwinding commencement detector will be described. Generally, the process of casting and retrieving a rig is repeatedly performed in the following manner while fishing:

(1) Operating a clutch or a bale arm to enable the fishing line 31 to be unwound;
(2) Casting out a rig swinging a rod or dropping the rig due to the gravity of a weight to unwind the fishing line 31;
(3) Enabling the fishing line 31 to be wound (not-unwindable) by the operation reverse to (1) when the rig reaches a predetermined spot;
(4) Waiting for a fish bite by means appropriate to fish species and fishing method by, for instance, operating an operation portion 14 to let the lure swim or remain as it is;
(5) Operating the operation portion 14 to wind the fishing line 31, and retrieving the rig when a fish is caught or a predetermined time has elapsed;
(6) Collecting the fish caught, or replacing the bait and the lure as necessary when completing the winding-up, and starting the operation in (1) again.

Therefore, the accumulated operation information listed for each casting of a rig (each commencement of the unwinding of a fishing line) is easily understandable to users and is useful. The fishing line unwinding commencement detector detects that the unwinding of the fishing line has commenced, and lists the operation information based on the detection results.

The unwinding commencement detector can be realized as follows. In the doublebearing reel 10A, (1) can be recognized when an unwindable state detector 194 detects that the connected clutch 12 is disconnected. Thereafter, (2) can be recognized when the spool rotation detector 192 detects that the spool 11A starts rotating. Then, (3) can be recognized when the unwindable state detector 194 detects that the disconnected clutch 12 is connected. It can be deemed that the commencement of the unwinding of the fishing line 31 is detected when (1) to (3) referred to above are successively recognized.

In the other method, when the commencement of rotation of the spool 3 is detected after the length of a fishing line pulled out becomes equal to or less than a predetermined value, the unwinding of the fishing line can be considered to have commenced. In this method, it is necessary to accurately calculate the length of the fishing line pulled out, while it is possible to detect the unwinding of the fishing line without using the unwindable state detector 194.

Next, in the spinning reel 10B, the spool 11B does not rotate when the fishing line 31 is unwound. Therefore, it is difficult to recognize (2) by a detector in the reel 10B. However, (1) is recognized when the unwindable state detector 194 detects that the bale opens and thereafter, (3) is recognized when the detector detects that the bale is closed. Thereby, the commencement of the unwinding of the fishing line 31 can be considered to have detected.

Figure 5:
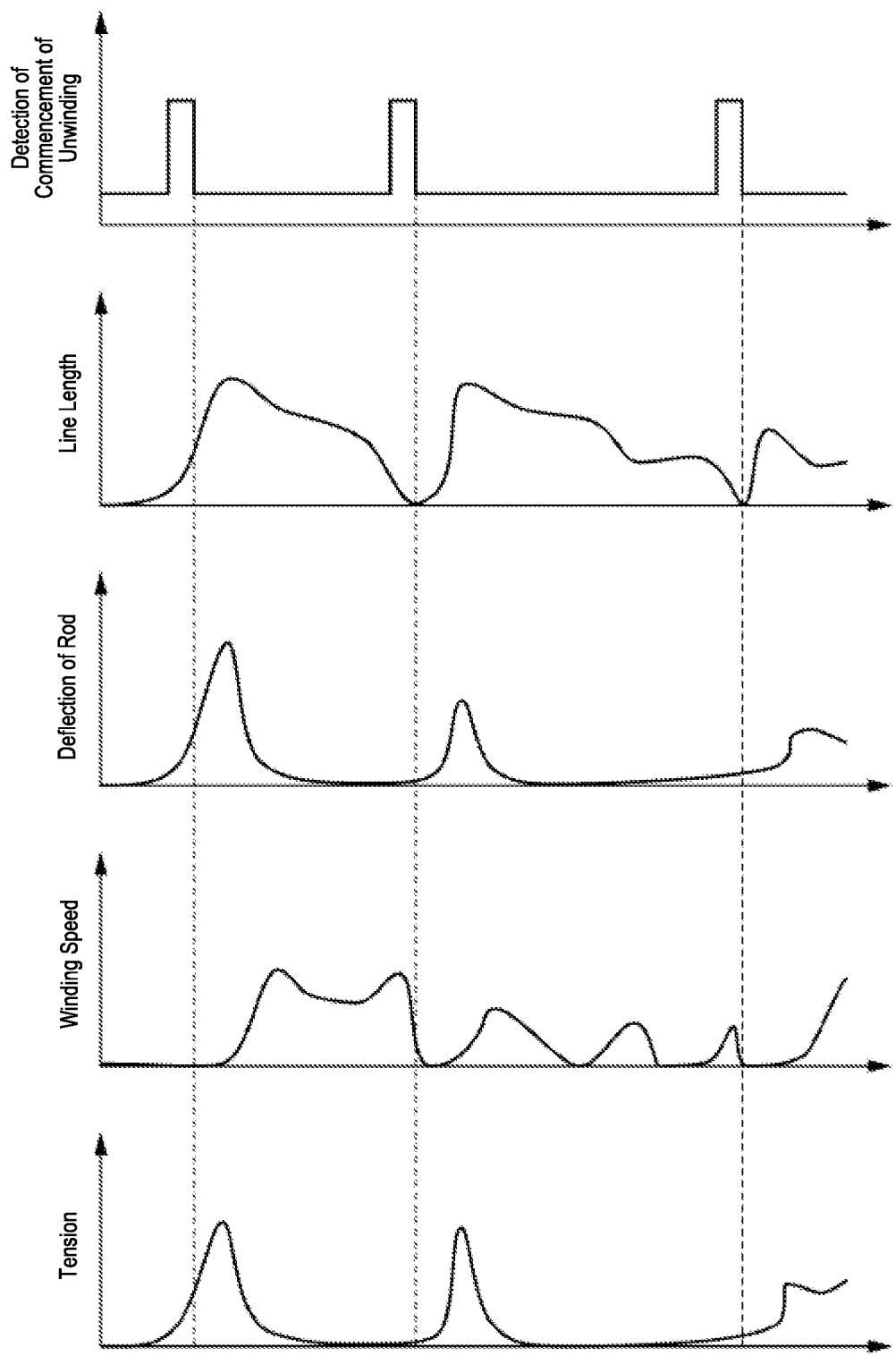
FIG. 5 is a diagram illustrating an example of results detected in a fishing information management system according to an example.

Next, a method of creating an operation information list with an operation information list creation portion 36 will be described. The detector 19 of the reel 10 and the detector 21 of the fishing rod 20 output various detection results along with the operation to the tackle. The output results are calculated as necessary to obtain operation information. Examples of the operation information include the length of a fishing line unwound, the deflection of a fishing rod, the winding speed of an operation means, and the tension of the fishing line, which are shown in FIG. 5.

Other examples of the operation information include, for example, the length of a fishing line pulled out by a drag device, unwindable state of the fishing line, the set drag force, the set braking force value of a braking device, the elevation angle of a fishing rod, the translational speed and the rotation speed. The operation information obtained is divided each time when the fishing line unwinding commencement detector detects the unwinding of the fishing line. An operation information list is created by arranging the divided information in order. FIG. 6 shows an example of a list created by extracting operation information each time when the unwinding of the fishing line commenced.

In this example, the No. column indicates the number of castings, which is the serial number from the start of fishing. The time column indicates the time when the commencement of the unwinding of the fishing like was detected. In the flying distance column, the maximum length of the fishing line after the commencement of the unwinding of the fishing line is detected is regarded as the flying distance. The winding speed column indicates the average winding speed of the operation portion 14 during the winding operation. The tension column indicates the maximum tension detected by the tension detector 191 at that time.

As in this example, the maximum value or the average value of each detection result may be extracted as a representative value, or chronological data of detection results that is extracted at a predetermined sampling time may be retained. Further, detection results may be retained separately in each instance judging whether the fishing line 31 is being unwound (cast) or being wound by detecting the state of the unwindable state detector 194 and the state of the winding operation detector 193.

In this manner, operations performed in the tackle and the state of the tackle can be detected by the detectors 19 and 21. The results thereof can be aggregated for each casting of a rig to create a list using the unwinding commencement detector and the list creation portion 36 in the reel 10. If the list can be linked to information obtained from devices other than the tackle, more detailed information can be provided to users. Further, a receiver 35 can receive fishing information obtained by the external device 50. Moreover, a processor 33 links the acquired information to an information list in accordance with the type of the information.

An electronic device (external device) 50 is an imaging device that generates image data related to fishing, and configured such that the operation information list and the image data generated by the imaging device are associated with each other by the fishing information processing device 40. The generated image data is associated with the operation information listed in the operation information list after the commencement of the unwinding of the fishing line and immediately before the image is taken. In this manner, related operation information can be linked to image data, which makes it possible to improve the level of fisherman satisfaction with fishing.

FIG. 7 shows an example of linking an operation information list to image data. In this example, a photo 1 was taken at 10:16 in the course of or after the sixth casting of a rig, and the seventh casting started. Further, photos 2 and 3 were taken at 10:18 in the course of or after the eighth casting of the rig. Therefore, photo 1 is linked to the sixth casting, and photos 2 and 3 are linked to the eighth casting. This makes it possible to display image data (including videos) taken while fishing, which include image information such as the fish caught, commemorative photos, fishing spot, weather conditions, and surrounding sceneries, in association with operation information for each casting, thereby improving the catch and satisfaction of users.

Figure 8:
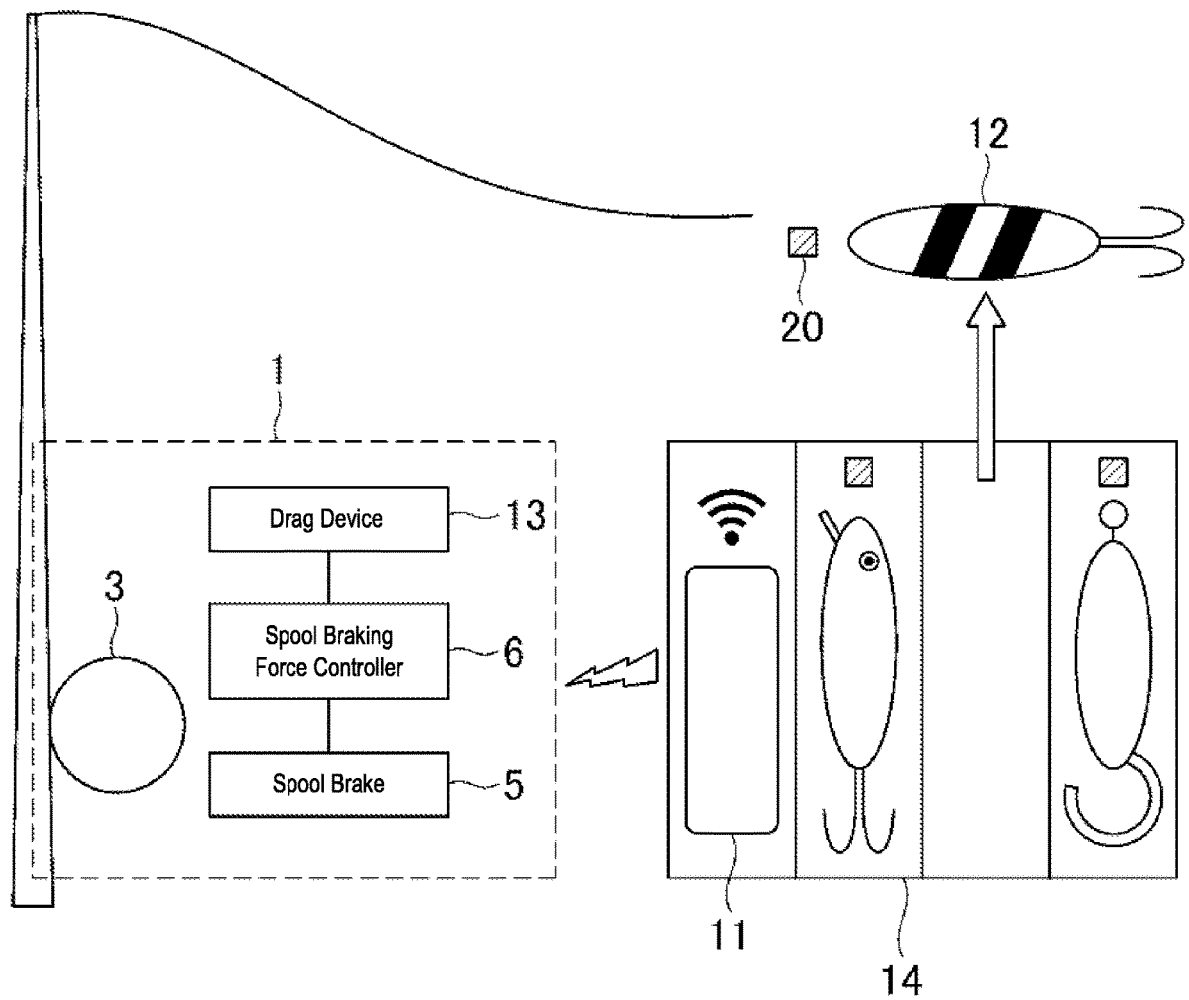
FIG. 8 is a diagram illustrating a fishing information management system according to an example.

The above-mentioned electronic device (external device) 50 is a rig recognition device 52 capable of recognizing a rig as shown in FIG. 8, and is configured such that the operation information list and the information on the rig recognized by the recognition device are associated with each other by the fishing information processing device 40. The recognition device 52 can recognize the rig information by recognizing the image of the rig or reading the tag information such as two-dimensional codes, and can transmit the information to the information processing device 40. The rig information includes a variety of information such as a lure, fishing line, float, weight, hook, reel and fishing rod that are used.

Next, FIG. 9 shows an example of linking the operation information list to the rig information. In this example, the fifth and the sixth castings were performed recognizing that the lure was replaced with a lure A at 10:14 before the fifth casting of the rig. Thereafter, the seventh and the eighth castings were performed, recognizing that the lure was replaced with a lure B at 10:16. Therefore, the fifth and the sixth castings are linked to the lure A, and the seventh and the eighth castings are linked to the lure B.

As described above, in the rig recognition device 52, the association is made with the operation information listed in the operation information list for the period from the recognition of a rig to the recognition of the next rig. This makes it possible to display, for example, the number of castings for each lure and the average flying distance in a day while fishing. In this manner, related operation information can be linked to the information on the rig being used, which makes it possible to improve the level of fisherman satisfaction with fishing. The time when the receiver 35 receives information from the rig recognition device 52 may be used as the timing of recognition of the rig; alternatively, time stamps obtained and stored in the rig recognition device 52 may be aggregated after receiving data.

Next, in the fishing information management system 100 according to an example, the above-mentioned electronic device (external device) 50 is the event recording device 53 provided in the fishing reel 1 or the fishing rod 21, and is configured such that the operation information list and the operation information of the event recording device recorded by the device are associated with each other by the fishing information processing device 40.

The event recording device may be, for example, an event recording button provided in the reel 10. When the event recording button is operated, it is possible to record a time, for example, when a user feels a bite, when a fish is caught, or when a lure or the like is caught on an obstacle (snagging). FIG. 10 shows an example of linking the operation information list to the recorded event information. In this example, the occurrence of a snagging is recorded when an operation button 1 is pressed, and a hit of fish when an operation button 2 is pressed. The button 1 was operated at 10:15:30 upon the fifth casting, and the button 2 was operated at 10:17:30 upon the eighth casting. Thus, the fifth casting is linked to a "snagging" event, and the eighth casting to a "hit" event.

As a result, a user can grasp, for example, the fishing results in the next time for, and degree of wear and tear of, each lure, and can use the information as a reference in selecting a lure in the next time fishing or doing maintenance. In this manner, related operation information can be linked to the event information, which makes it possible to significantly improve the level of fisherman satisfaction with fishing.

Next, the above-mentioned electronic device (external device) 50 is the fish-finder 56, and configured such that the operation information list and fish school information acquired by the fish-finder 56 are associated with each other by the fishing information processing device 40. The fish-finder 56 uses a sonar to provide water depth information, submarine geological information, and the presence or absence of underwater suspended solids such as fish school. These are collectively defined as fish school information.

FIG. 11 shows an example of linking an operation information list to fish school information. In this example, the link is made, calculating representative values of water depth and fish school's reaction by acquiring the average value of the fish school information within each casting period. Incidentally, all time changes in the sonar reaction within a casting period may be recorded as numerical values, or the link may be made to sonar reactions recorded as image information. In this manner, related operation information can be linked to the fish school information at that time, which makes it possible to improve the level of fisherman satisfaction with fishing.

Next, the above-mentioned electronic device (external device) 50 is the environment sensor 54, and configured such that the operation information and environment information recorded by the environment sensor 54 are associated with each other by the fishing information processing device 40. The environment sensor 54 is a sensor that acquires surrounding weather information and position information, and is any or all of a water temperature meter, a thermometer, a hygrometer, an anemometer, a barometer, an altimeter, and a GPS.

FIG. 12 shows an example using a water temperature meter and a hygrometer as the environment sensor 54. In this example, the values of the environment sensor 54 are obtained each time when the commencement of unwinding is detected, which are linked to the operation information list. The environment sensor 54 may be configured integrally with the information processing device 40. In this manner, related operation information can be linked to the then environment information, which makes it possible to improve the level of fisherman satisfaction with fishing.

Next, the above-mentioned electronic device (external device) 50 is the information terminal 55 capable of connecting to the Internet, and configured such that the operation information list and the information acquired by the information terminal 55 are associated with each other by the fishing information processing device 40.

Figures 13, 14:
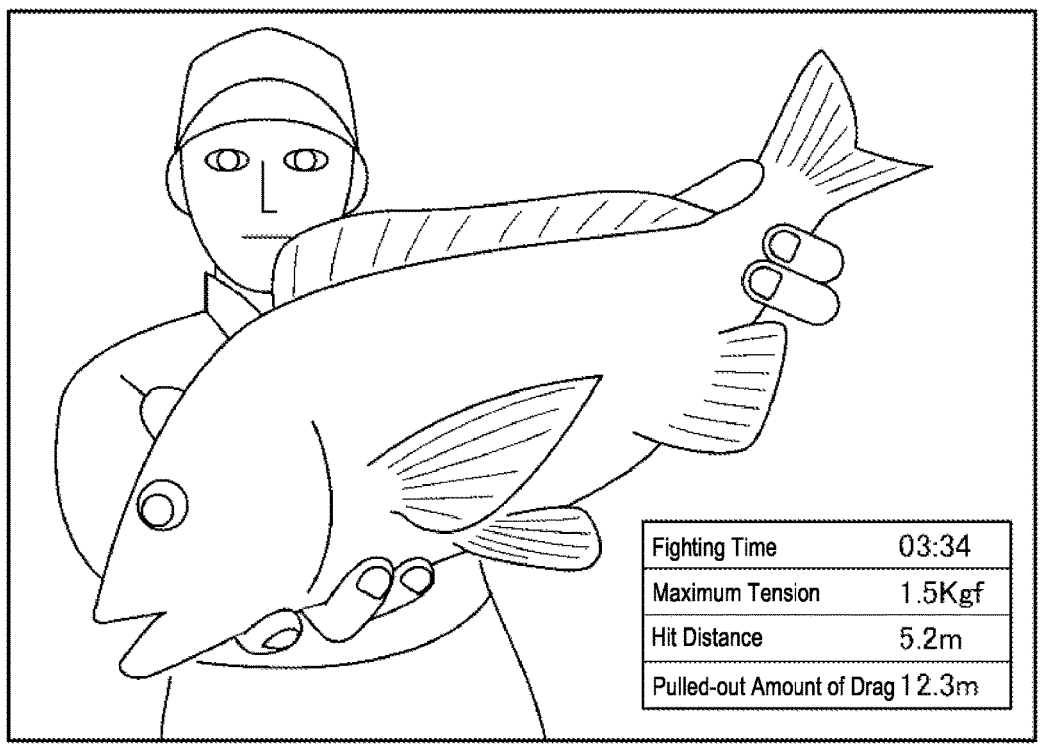
FIG. 13 is a diagram illustrating an example of an operation information list linked to acquired information in a fishing information management system according to an example.
FIG. 14 is a diagram illustrating an example of an operation information list linked to acquired information in a fishing information management system according to an example.

FIG. 13 shows an example of linking an operation information list to information acquired by the information terminal 55. In this example, information on tides is obtained from a network. Though information on tides is said to be a very important factor in fishing, it is difficult to measure the same with small equipment, but predicted values can be obtained from the Japan Meteorological Agency's database and the like. As described above, information that is difficult to be measured and acquired by the tackle or the external device 50 alone can be obtained by accessing external databases. In this manner, related operation information can be linked to the information obtained at that time with reference to external sources, which makes it possible to improve the level of fisherman satisfaction with fishing.

In this manner, we provide a fishing information management system including a fishing rod to which a fishing reel capable of linking various fishing information in conjunction with an electronic device (external device).

The operation information of the fishing reel 10 is configured to include at least one of the date and time of use of the reel, the number of uses of the reel, the information on the unwinding of a fishing line wound on a spool, the spool diameter, the maximum spool rotation speed, the spool rotation speed history, the brake setting, the backlash information, the clutch operation information, the drag operation information, and the information on the fishing line wound on the spool.

The operation information of the fishing rod 20 is configured to include at least one of the date and time of use, the number of uses, the elevation angle, the angular velocity, the angular acceleration, the translational speed, the translational acceleration, the direction, the deformation, and the casting method, of the fishing rod.

Next, the processing method of the fishing information management system 100 according to an example includes steps of detecting by the fishing line unwinding commencement detector the commencement of the unwinding of the fishing line 31 by the fishing reel 10, detecting the operation information of at least either of the fishing reel or the fishing rod by the operation information detector, extracting the operation information each time when the unwinding of the fishing line commences and creating an operation information list that aggregates several operation information, by the operation information list creation portion 36, acquiring fishing information from an external device by the receiver 35, and associating the operation information list with the fishing information by the processor 33, embodied in the fishing information management system 100 including the fishing rod 20 to which the fishing reel 10 with the spool 11 capable of winding the fishing line 31 is attached.

The processing method of the fishing information management system 100 can link various fishing information in conjunction with an external device.

Next, another aspect of associating fishing information obtained from an external device with an operation information list will be described. Possible methods of linking the operation information list to the external data includes both the method of linking the fishing information to the operation information list, and the method of linking the operation information list to the fishing information, and the latter will be described with reference to FIGS. 14 to 16.

First, FIG. 14 shows an operation information list linked to image information relating to fishing that is acquired by an imaging device, or more specifically, the operation information list that is combined into the image information. When linking the image information to the operation information list, the link is made to the casting data that is the latest with respect to when the image is taken as is described above.

As shown in FIG. 14, each information of the fighting time, the maximum drag force, the hit distance, and the pulled-out amount of a drag, which are part of the operation information list, is combined as a text image into a photo of a fish caught used as image information. By doing so, the user can provide not only the image information of the fish but also the operation information of fishing tools such as the fighting time and the pull-out strength upon catching the fish, when showing the photo of the fish caught to others. This makes it possible to give all the information together that the user wants to know.

The fighting time is the time from when a fish takes a hook to when the fish is landed. For example, the time can be measured by detecting that a fish has taken a hook when the tension detector 191 or the deflection detector 211 shows a value equal to or more than a predetermined value, and then detecting the time when the line length has become equal to or less than a predetermined value as the time when the fish is landed. The maximum tension is the maximum tension when fighting the fish, which can be obtained by the tension detector 191. The hit distance is the line length when the fish takes the hook. The pulled-out amount of a drag is the total length of the line unwound by the drag device after the fish takes the hook.

The stronger the swimming power of a fish is, the greater the fighting time, the maximum tension, and the pulled-out amount of a drag tend to be. It is possible to provide more information in an easily identifiable manner by liking the information described above to image information.

Figure 15:
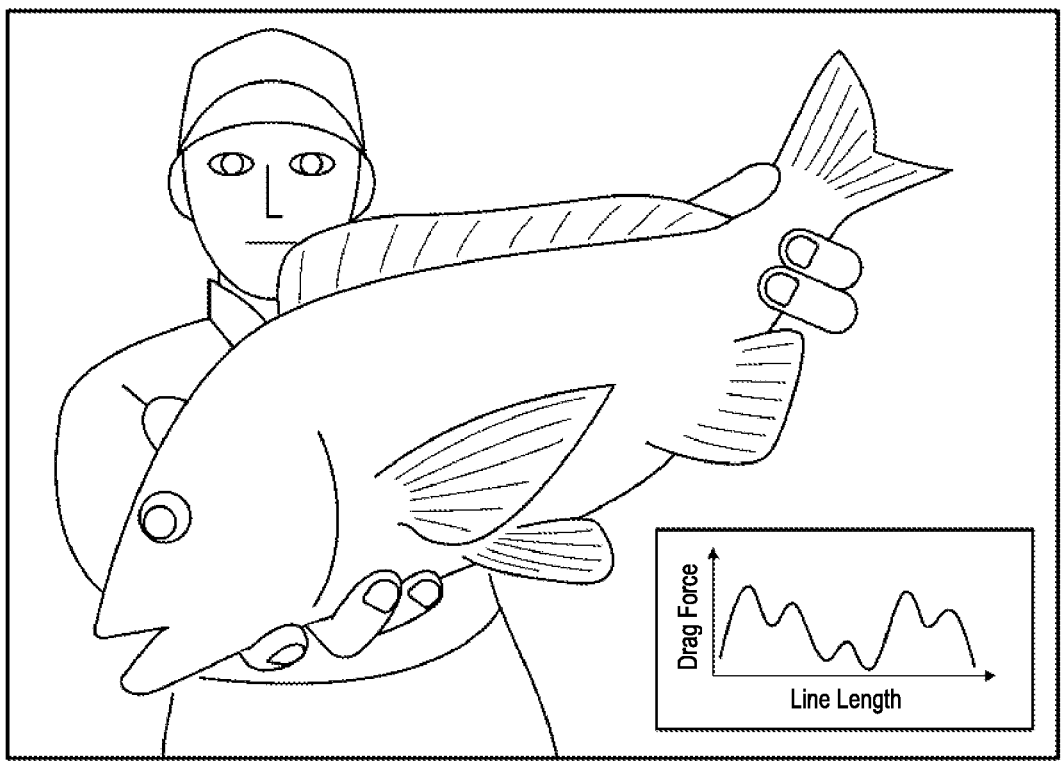
FIG. 15 is a diagram illustrating an example of an operation information list linked to acquired information in a fishing information management system according to an example.

Next, FIG. 15, similarly to FIG. 14, shows an operation information list linked to image information relating to fishing acquired by an imaging device, or more specifically, the operation information list that is combined into the image information. When linking the image information to the operation information list, the link is made to the casting data that is the latest with respect to when the image is taken as is described above.

As shown in FIG. 15, a graph representing changes in drag force with the horizontal axis as line length and with the vertical axis as drag force, which are part of the operation information list, is combined as a text image into a photo of a fish caught used as image information. By doing so, the user can provide not only the image information of the fish but also the information of fishing tools that indicates the relationship between the line length and the drag force by the time the fish is landed, when showing the photo of the fish caught to others. This makes it possible to give all the information together that the user wants to know.

Figure 16:
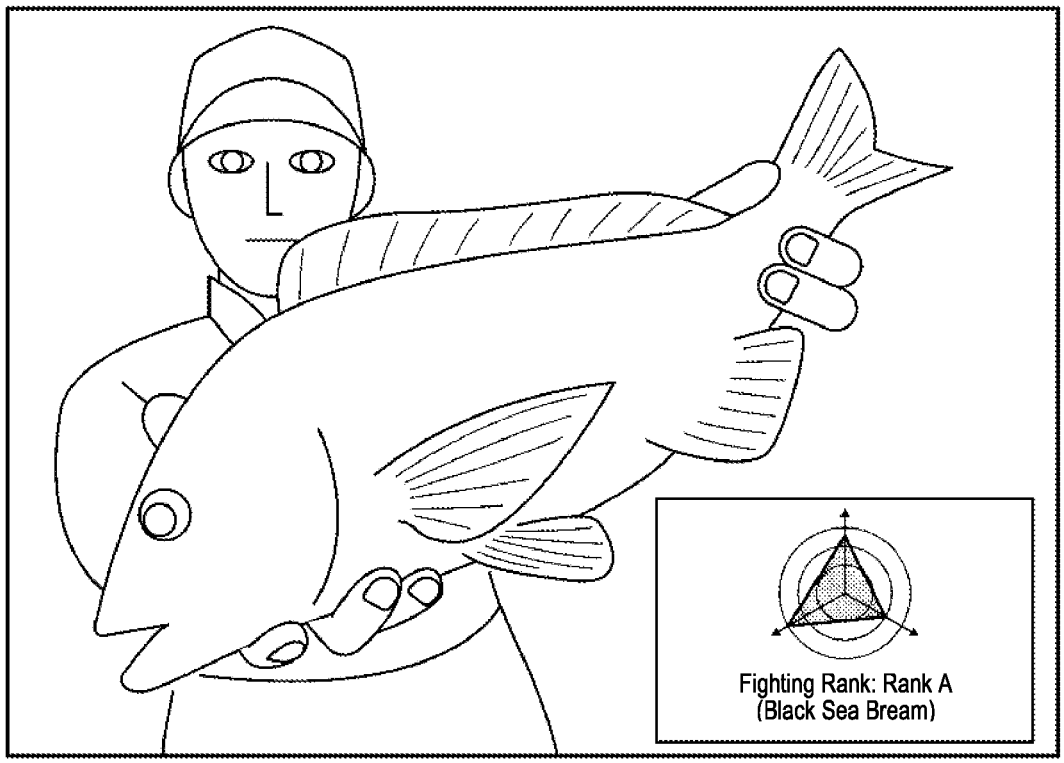
FIG. 16 is a diagram illustrating an example of an operation information list linked to acquired information in a fishing information management system according to an example.

Next, FIG. 16, similarly to FIGS. 14 and 15, shows an operation information list linked to image information relating to fishing acquired by an imaging device, or more specifically, the operation information list that is combined into the image information. When linking the image information to the operation information list, the link is made to the casting data that is the latest with respect to when the image is taken as is described above.

As shown in FIG. 16, a graph visually representing the fighting time, the pulled-out amount, and the drag force, and indicating the ranking (fighting rank) (rank A in the example), which are part of the operation information list, is combined as a text image into a photo of a fish caught used as image information. By doing so, the user can provide not only the image information of the fish caught but also the information of fishing tools that indicates the fighting time, the pulled-out amount, and the drag force by the time the fish is landed as well as the rank, when showing the photo of the fish caught to others. This makes it possible to give all the information together that the user wants to know.

With respect to the display of rankings, deviation values may be displayed and rankings may be judged in comparison with statistical values of all users or the like, and such information may be combined. For the target for comparison, the fish species that appears in a photo may be distinguished by a known image recognition means, and compared with the statistical values for each fish species, or a user may be allowed to select any fish species. Further, various operation information lists (operation information) other than the operation information lists (operation information) described with reference to FIGS. 14 to 16 can also be used. Moreover, the image information relating to fishing is not limited to the illustrated examples.

The dimensions, materials and arrangements of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

What is claimed is:

1. A fishing information management system having a fishing rod to which a fishing reel with a spool capable of winding a fishing line is attached, comprising:
   a fishing line unwinding commencement detector configured to detect commencement of unwinding of the fishing line by the fishing reel;
   an operation information detector configured to detect operation information of at least one of the fishing reel and the fishing rod;
   a spool rotation detector that detects rotation of the spool;
   an operation information list creation portion configured to extract the operation information each time the unwinding of the fishing line commences, and create an operation information list that aggregates several pieces of the operation information;
   a hardware processor configured to:
      obtain fishing information from an external device, and associate most recent operation information in the operation information list with the fishing information before the fishing information is generated, the most recent operation information corresponding to the most recent unwinding of the fishing line, and
   an indicator configured to display the operation information list and the fishing information that are associated with each other, wherein
   the external device comprises a fish-finder,
   the operation information list is associated with fish school information acquired by the fish-finder,
   the fishing reel is a double-bearing reel or a spinning-type reel,
   in a case where the fishing reel is a double-bearing reel, the fishing line unwinding commencement detector detects that
      (i) the fishing line is enabled to be unwound when the fishing line unwinding commencement detector detects that a connected clutch is disconnected,
      (ii) the fishing line is being unwound when the spool rotation detector detects that the spool starts rotating, and
      (iii) the fishing line is not-unwindable when the fishing line unwinding commencement detector detects that the disconnected clutch is connected, and
      the fishing line unwinding commencement detector detecting the commencement of the unwinding of the fishing line when (i), (ii), and (iii) occur in sequence, and
   in a case where the fishing reel is a spinning-type reel, the fishing line unwinding commencement detector detects that
      (i) the fishing line is being unwound when the fishing line unwinding commencement detector detects that a bale arm opens, and
      (ii) the fishing line to be not-unwindable when the fishing line unwinding commencement detector detects that the bale arm is closed,
      the fishing line unwinding commencement detector detecting the commencement of the unwinding of the fishing line when (i) and (ii) occur in sequence.

2. The fishing information management system according to claim 1, wherein the operation information detector includes a reel operation information detector configured to detect the operation information of the fishing reel, and a fishing rod operation information detector configured to detect the operation information of the fishing rod.

3. The fishing information management system according to claim 1, wherein the operation information of the fishing reel includes at least one of a date and time of use of the fishing reel, a number of uses of the fishing reel, information on the unwinding of the fishing line wound on the spool, a spool diameter, a maximum spool rotation speed, a spool rotation speed history, a brake setting, backlash information, clutch operation information, drag operation information, and information on the fishing line wound on the spool.

4. The fishing information management system according to claim 1, wherein the operation information of the fishing rod includes at least one of a date and time of use, a number of uses, an elevation angle, an angular velocity, an angular acceleration, a translational speed, a translational acceleration, a direction, a deformation, and a casting method, of the fishing rod.

5. The fishing information management system according to claim 1, wherein the external device further comprises an imaging device configured to generate image data related to fishing, and the operation information list is associated with the image data.

6. The fishing information management system according to claim 1, wherein the external device further comprises a recognition device configured to recognize a rig, and the operation information list is associated with information about the rig.

7. The fishing information management system according to claim 1, wherein the external device further comprises an event recording device provided in the fishing reel or the fishing rod, and the operation information list is associated with the operation information of the event recording device.

8. The fishing information management system according to claim 1, wherein the external device further comprises an environment sensor configured to acquire environmental information including at least one of water temperature, air temperature, humidity, wind speed, air pressure, latitude, longitude, and altitude, and the operation information list is associated with the environmental information.

9. The fishing information management system according to claim 1, wherein the external device further comprises an information terminal configured to connect to the Internet, and the operation information list is associated with information acquired from the Internet.

10. A method of processing fishing information in a fishing information management system that includes a fishing rod to which a fishing reel with a spool capable of winding a fishing line is attached, comprising:

detecting, by a fishing line unwinding commencement detector, commencement of unwinding of the fishing line by the fishing reel;

detecting, by a spool rotation detector, rotation of the spool;

detecting operation information of at least one of the fishing reel and the fishing rod by an operation information detector;

extracting the operation information each time the unwinding of the fishing line commences, and creating an operation information list that aggregates several operation information, by an operation information list creation portion;

receiving fishing information by a processor from an external device;

associating most recent operation information in the operation information list with the fishing information by the processor before the fishing information is generated, the most recent operation information corresponding to the most recent unwinding of the fishing line, and displaying the operation information list and the fishing information that are associated with each other by an indicator, wherein the external device comprises a fish-finder, the operation information list is associated with fish school information acquired by the fish-finder, the fishing reel is a double-bearing reel or a spinning-type reel, in a case where the fishing reel is a double-bearing reel, the fishing line unwinding commencement detector detects that
  (i) the fishing line is enabled to be unwound when fishing line unwinding commencement detector detects that a connected clutch is disconnected,
  (ii) the fishing line is being unwound when the spool rotation detector detects that the spool starts rotating, and
  (iii) the fishing line is not-unwindable when the fishing line unwinding commencement detector detects that the disconnected clutch is connected,
  the fishing line unwinding commencement detector detecting the commencement of the unwinding of the fishing line when (i), (ii), and (iii) occur in sequence, and in a case where the fishing reel is a spinning-type reel, the fishing line unwinding commencement detector detects that
  (i) the fishing line is being unwound when the fishing line unwinding commencement detector detects that a bale arm opens, and
  (ii) the fishing line to be not-unwindable when the fishing line unwinding commencement detector detects that the bale arm is closed,
  the fishing line unwinding commencement detector detecting the commencement of the unwinding of the fishing line when (i) and (ii) occur in sequence.

* * * * *